Figure 1:
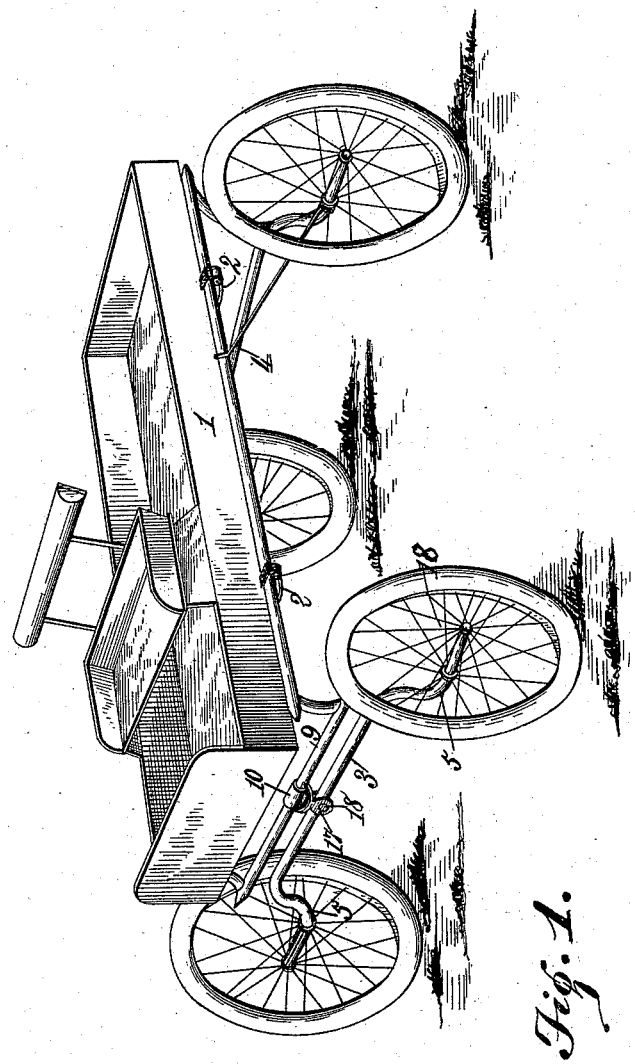

(No Model.)  
2 Sheets—Sheet 1.

S. M. SCHINDEL.
VEHICLE.

No. 558,002. Patented Apr. 7, 1896.

Witnesses:  
A. R. Appleman Jr.  
Robert Garrett

Inventor:  
Samuel M. Schindel.  
By Chas. B. Tilden  
Atty.

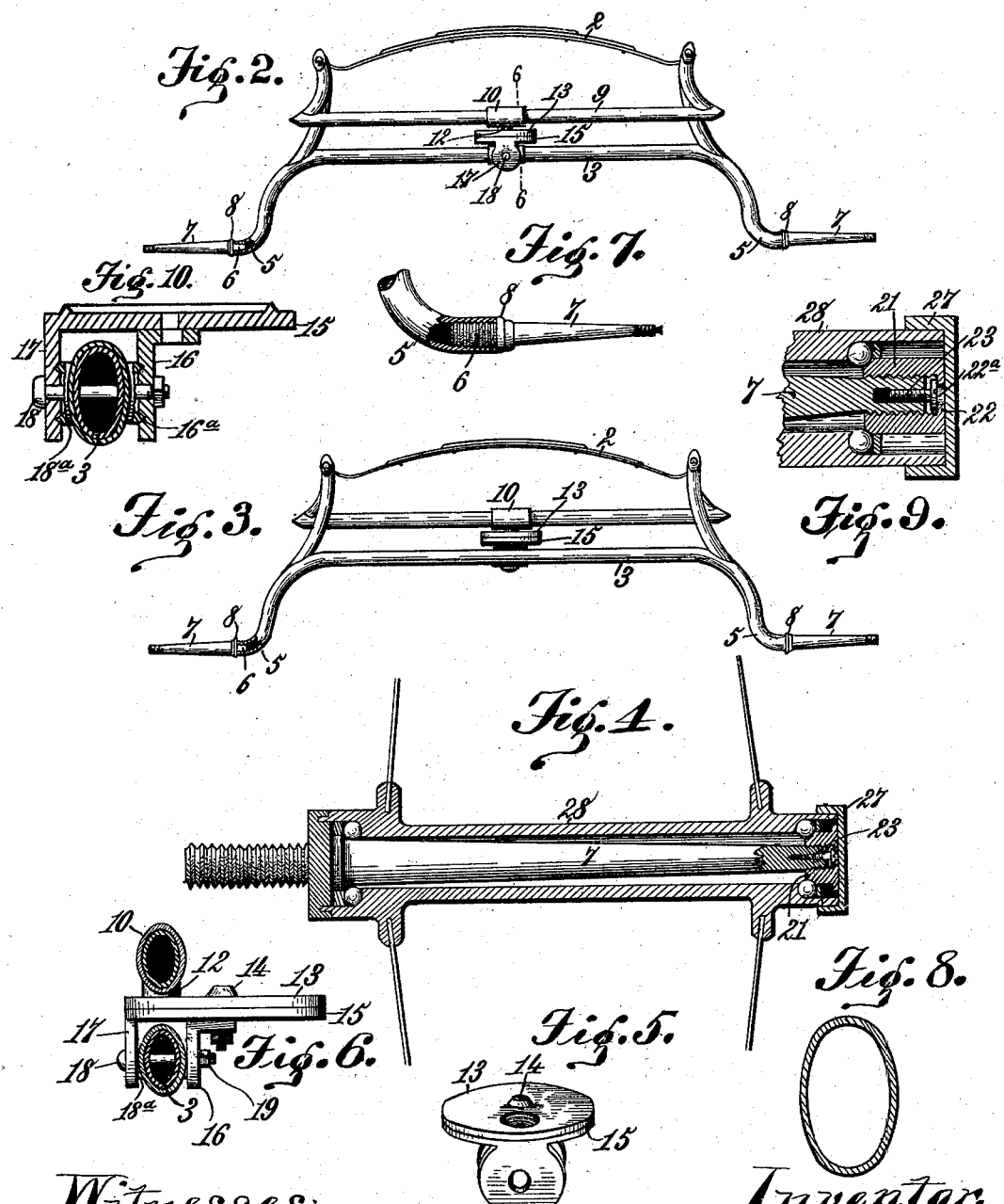

UNITED STATES PATENT OFFICE.

SAMUEL MILFORD SCHINDEL, OF HAGERSTOWN, MARYLAND.

VEHICLE.

SPECIFICATION forming part of Letters Patent No. 558,002, dated April 7, 1896.

Application filed August 23, 1895. Serial No. 560,306. (No model.)

*To all whom it may concern:*

Be it known that I, SAMUEL MILFORD SCHINDEL, a citizen of the United States, residing at Hagerstown, in the county of Washington and State of Maryland, have invented new and useful Improvements in Vehicles of Bicycle Type, of which the following is a specification.

My present invention relates to vehicles of bicycle type, my purpose being to improve and simplify the construction shown, described, and claimed in the Letters Patent granted to me December 10, 1895, No. 551,146, in the following particulars.

It is my object, first, to improve the construction of the frame of the vehicle as a whole by forming the same of tubular metal which is brought by suitable means to elliptical or substantially elliptical form in cross-section, the major axis being substantially parallel with the direction of the maximum strain imposed upon the frame.

It is my object, secondly, to provide a vehicle of the type defined in which the wheel bearings or spindles shall be screwed directly into the outwardly-turned ends of the tubular axles and form practically continuations of the same.

It is my purpose, thirdly, to provide a simple and novel means of adjustment of the ball-bearing cone upon the outer end of the axle or wheel-spindle, by which it may, after proper adjustment, be firmly and permanently locked in position by the manipulation of a screw tapped into the end of the spindle and accessible to a screw-driver through an opening in the end of the ball-bearing cone.

Finally, it is one purpose of my invention to provide a novel and simple form of fifth-wheel connection between the forward axle and the front cross-bar of the vehicle-frame, whereby I obtain a perfect pivotal bearing for the front axle, prevent all noise and rattling due to wear and other causes, and enable the person using the vehicle to make compensation for wear and preserve a tight noiseless connection as long as the vehicle is capable of use.

To enable those skilled in the art to which my invention pertains to clearly understand and practice my said invention, I will now proceed to explain the same in detail, reference being had for this purpose to the accompanying drawings, in which—

Figure 1 is a perspective view of a vehicle of bicycle type in which my invention is incorporated. Fig. 2 is a detail front elevation of the forward axle and that portion of the frame connected to it, showing the fifth-wheel and the manner of connecting the wheel-spindles to the outwardly-turned ends of the tubular axle. Fig. 3 is a similar view showing the same parts in rear elevation. Fig. 4 is a central longitudinal section of one of the wheel-spindles or journals, showing the anti-friction-bearings and locking the ball-bearing cone upon the outer end of the spindle. Fig. 5 is a detail perspective of the fifth-wheel connection. Fig. 6 is a detail section upon the line 6 6 in Fig. 2. Fig. 7 is a sectional elevation showing one of the wheel-spindles and its connection to the outwardly bent or turned end of the axle. Fig. 8 is a transverse section showing the general form of the tubular parts of the vehicle-frame. Fig. 9 is a detail section showing the ball-bearing cone and its means of adjustment, this figure, as well as Figs. 4 and 5, being upon a slightly-enlarged scale. Fig. 10 is a vertical section from front to rear through the center of the transverse connection.

The reference-numeral 1 in said drawings indicates the box or body of the vehicle, which may be of any preferred form and supported by springs 2, as shown in Figs. 2 and 3, or in any manner desired. These features have no material bearing upon my invention, which comprises the following improvements:

The front and rear axles 3 and 4 are substantially similar in form, each being formed of tubular metal which is bent at each side to bring the ends of the axle below its body portion to enable the wheels to turn beneath the body or box 1. The extremities 5 of each axle are bent or turned outward and each extremity is provided with an interior or female thread to enable it to receive the threaded terminal 6 of a wheel-spindle 7, a shoulder or rib 8 being formed thereon, which turns up against the end of the axle and forms a tight joint therewith. Throughout the metallic frame the tubular portions are bent or formed in such manner that each has in cross-section a substantially elliptical form, the major axis being parallel with the line of greatest strain, or practically so, the exception being the outwardly-turned ends of each axle, the circular form being preserved at these points to permit the insertion of the threaded terminals of the wheel-spindles. By this construction, which is substantially indicated in Figs. 6 and 8, I provide a metallic frame for a vehicle which possesses maximum strength and minimum weight. I am aware, of course, that this principle of mechanical construction is broadly old; but I am not aware that it has ever heretofore been applied to the frame of a vehicle.

The front axle 3 is connected to the fore part of the body of the vehicle by a fifth-wheel (shown in Figs. 5 and 6) consisting of the following parts: Upon the front cross-bar 9 is mounted a central fitting 10, which is elliptical, like the axle, and fits closely thereon, being brazed or otherwise permanently connected to it. From this fitting 10 hangs a central stem 12, which unites rigidly with an upper fifth-wheel plate 13, in line with and in front of its central pivotal connection 14, which unites the upper plate 13 to the second or lower fifth-wheel plate 15. Upon the lower face of the latter plate are a detachable angle-plate 16 and a hanging bracket 17 in front of said angle-plate, said bracket being usually integral with the lower plate 15 at its central point and forward edge. Between these two members the elliptical front axle is inserted and connected by a bolt 18 passing through all the parts, a nut 19 being turned upon its end and screwed up against the angle-plate 16.

The transverse connection 3 is provided, as shown in Fig. 10, with projections 18ª, having circular ribs or edges which are tapered or wedge-shaped and lying in correspondingly-shaped channels 16ª in the inner faces of the angle-plates 16 and 17, being drawn into said channels by screwing up the nut 19. This construction takes up the wear of the parts and preserves a tight connection at all times, so that there is no rattling. I may provide the central pivotal connection 14 with a similar construction, if desired.

Upon the outer threaded ends of the wheel-spindles 7 I turn ball-bearing cones 21, of ordinary construction. In order to give any required adjustment to these cones and to lock them at the points to which they are adjusted in the most simple and effective manner and with the least expenditure of time and trouble, I form the parts in the manner shown in Fig. 9, in which the numeral 7 denotes the wheel-spindle, the outer extremity of which has an exterior screw-thread. Upon this threaded end is screwed the ball-bearing cone 21, its outer end having a flange 22, which incloses the end of the threaded spindle save for an opening 22ª, concentric with it. This opening exposes the head of a screw 23, which is tapped into the end of the spindle 7. The slotted head of this screw is of nearly the same diameter as the interior of the flange 22, and the pitch of the screw-threads on the spindle 7 and the screw 23 is different, and, if desired, these threads may be of opposite pitch.

A screw-cap 27 is provided upon the end of the hub 28 to protect the bearings from dust, and by simply removing this cap the ball-bearing cone 21 can be adjusted by turning it in one direction or the other on the threaded cone of the spindle 7.

When the proper adjustment is effected, a screw-driver is inserted through the opening 22 in the outer end of the cone and the screw 23 is turned back until its flat slotted head is in such position that it will abut firmly against the inwardly-turned flange 22 of the ball-bearing cone when the latter is turned to its proper place. As the two are of different and may, if desired, be of opposite pitch, neither can turn without causing the other to abut more firmly against it, thus providing a simple and effective lock for the ball-bearing cone 21.

By the improvements hereinbefore described I simplify and cheapen the construction of this type of vehicles, largely increase the strength of the frame and at the same time lighten it, thus effecting a material economy of metal, obtaining a more graceful and less cumbersome structure, avoiding all noise and rattling of the parts, allowing a perfect compensation for wear, and providing a vehicle having the maximum strength and duration and capable of being produced at a minimum cost.

What I claim is—

1. A wheeled vehicle having a metallic, tubular frame which comprises axles that are arched upward to provide raised middle portions to support the body, the downwardly-bent ends having outwardly-extending extremities which receive the threaded ends of the wheel-spindles, the tubular portions being substantially elliptical in cross-section and having their major axes in, or parallel with the lines of strain, and the outwardly-turned ends of the axles being circular to receive and retain the wheel-spindles, substantially as described.

2. A vehicle having a frame composed of tubular metallic members, substantially elliptical in cross-section and having their major axes practically parallel with the lines of greatest strain, a fitting rigidly mounted upon the front cross-bar of the frame and connected to an upper fifth-wheel plate, a lower fifth-wheel plate having a central pivotal connection to the upper plate and an eccentric rigid connection to a fitting on the axle, and an adjustable transverse connection between the axle and the lower plate, substantially as described.

3. A bicycle type of vehicle comprising a tubular metallic frame having upwardly-arched axis, the downwardly-bent ends having outwardly-turned extremities to receive the threaded ends of the wheel-spindles, said ends being circular while the other parts of the axles are elliptical in cross-section, with their major axes in the lines of greatest strain, each wheel-spindle having an adjustable ball-bearing cone on its threaded outer end with a screw tapped into the spindle and having its flat head in a cap on the end of the cone said cap having a central opening for a screw-driver, substantially as described.

4. In a vehicle of the type described, the combination with a fitting rigidly mounted on the front cross-bar, of an upper fifth-wheel plate connected to said fitting, a lower fifth-wheel plate pivotally connected to the upper plate, a front axle lying between a rigid bracket and an adjustable angle-plate on the lower fifth-wheel plate, and a bolt having tapered portions which lie in vertical elongated openings in said plate and bracket, substantially as described.

In testimony whereof I have hereunto set my hand in presence of two subscribing witnesses.

SAMUEL MILFORD SCHINDEL.

Witnesses:
 EWELL A. DICK,
 CHAS. B. TILDEN.